(12) United States Patent
Kim et al.

(10) Patent No.: US 8,870,429 B2
(45) Date of Patent: Oct. 28, 2014

(54) LIGHTING MODULE

(71) Applicant: LG Innotek Co., Ltd., Seoul (KR)

(72) Inventors: Han Gyoul Kim, Seoul (KR); Hwa Young Kim, Seoul (KR); Il Yeong Kang, Seoul (KR); Young Kuk Kwak, Seoul (KR); Sang Jun Hong, Seoul (KR); Jin Wook Kim, Seoul (KR); Young Sik Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/089,353

(22) Filed: Nov. 25, 2013

(65) Prior Publication Data

US 2014/0078777 A1   Mar. 20, 2014

Related U.S. Application Data

(63) Continuation of application No. 13/328,551, filed on Dec. 16, 2011, now Pat. No. 8,622,599.

(30) Foreign Application Priority Data

Dec. 21, 2010 (KR) .................. 10-2010-0131152
Apr. 28, 2011 (KR) .................. 10-2011-0040184
May 27, 2011 (KR) .................. 10-2011-0050542

(51) Int. Cl.
*F21V 7/04* (2006.01)
*F21V 8/00* (2006.01)

(52) U.S. Cl.
CPC ............ *G02B 6/0033* (2013.01); *G02B 6/0076* (2013.01); *G02B 6/0055* (2013.01); *G02B 6/0091* (2013.01); *G02B 6/0046* (2013.01); *G02B 6/0023* (2013.01)
USPC ........................................... 362/600; 362/612

(58) Field of Classification Search
USPC .................... 362/600, 612, 610, 621
See application file for complete search history.

(56) References Cited

U.S. PATENT DOCUMENTS

| 2003/0063456 A1 | 4/2003 | Katahira |
| 2008/0266902 A1 | 10/2008 | Zheng |
| 2008/0285274 A1 | 11/2008 | Jung |

FOREIGN PATENT DOCUMENTS

FR         2720181      11/1995

OTHER PUBLICATIONS

European Search Report for 11191336 dated Apr. 23, 2012.

*Primary Examiner* — Anne Hines
(74) *Attorney, Agent, or Firm* — Lowe Hauptman & Ham, LLP (57) ABSTRACT

A lighting module includes a first side light source; a second side light source; a first light guide plate disposed between the first side light source and the second side light source; a second light guide plate disposed between the first side light source and the second side light source and disposed below the first light guide plate; a reflective plate between the first light guide plate and the second light guide plate; a first case coupled to one side of the first light guide plate, coupled to one side of the second light guide plate, and receiving the first side light source; and a second case coupled to the other side of the first light guide plate, coupled to the other side of the second light guide plate, and receiving the second side light source.

20 Claims, 7 Drawing Sheets

LIGHTING MODULE

CROSS-REFERENCE TO RELATED APPLICATION

This application is a Continuation application of U.S. application Ser. No. 13/328,551 filed Dec. 16, 2011, which claims priority from Korean Application No. 10-2010-0131152, filed Dec. 21, 2010, No. 10-2011-0050542, filed May 27, 2011, No. 10-2011-0040184, filed Apr. 28, 2011, the subject matters of which are incorporated herein by reference.

BACKGROUND

1. Field

Embodiments may relate to a lighting module.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a lighting module. The lighting module comprises: a first side light source; a second side light source; a first light guide plate disposed between the first side light source and the second side light source; a second light guide plate disposed between the first side light source and the second side light source and disposed below the first light guide plate; a reflective plate between the first light guide plate and the second light guide plate; a first case coupled to one side of the first light guide plate, coupled to one side of the second light guide plate, and receiving the first side light source; and a second case coupled to the other side of the first light guide plate, coupled to the other side of the second light guide plate, and receiving the second side light source, wherein the reflective plate comprises a top surface and a bottom surface and wherein the top and the bottom surfaces of the reflective plate are coated with reflective materials having mutually different reflectances respectively, and wherein an amount of light which is emitted through a top surface of the first light guide plate is not equal to an amount of light which is emitted through a bottom surface of the second light guide plate.

Another embodiment is a lighting module. The lighting module comprises: a first side light source; a second side light source; a first light guide plate disposed between the first side light source and the second side light source; a second light guide plate disposed between the first side light source and the second side light source and disposed below the first light guide plate; a reflective plate between the first light guide plate and the second light guide plate; a first case coupled to one side of the first light guide plate, coupled to one side of the second light guide plate, and receiving the first side light source; and a second case coupled to the other side of the first light guide plate, coupled to the other side of the second light guide plate, and receiving the second side light source, wherein a material of the first light guide plate is different from a material of the second light guide plate, and wherein an amount of light which is emitted through a top surface of the first light guide plate is not equal to an amount of light which is emitted through a bottom surface of the second light guide plate.

Further another embodiment is a lighting module. The lighting module comprises: a first light guide plate; a second light guide plate disposed below the first light guide plate; a reflective plate between the first light guide plate and the second light guide plate; a first and a second light sources which are disposed on both sides of the first light guide plate respectively; a third and a fourth light sources which are disposed on both sides of the second light guide plate respectively; a first case coupled to one side of the first light guide plate and to one side of the second light guide plate; and a second case coupled to the other side of the first light guide plate and to the other side of the second light guide plate, wherein a value of current applied to the first and the second light sources is different from a value of current applied to the third and fourth light sources, and wherein an amount of light which is emitted through a top surface of the first light guide plate is not equal to an amount of light which is emitted through a bottom surface of the second light guide plate.

BRIEF DESCRIPTION OF THE DRAWINGS

Arrangements and embodiments may be described in detail with reference to the following drawings in which like reference numerals refer to like elements and wherein:

FIG. 8 is a view for describing how a first case 200*a*" of the lighting module shown in FIG. 5 is coupled to a first and a second light guide plates 110*a* and 110*b* of the lighting module shown in FIG. 5;

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
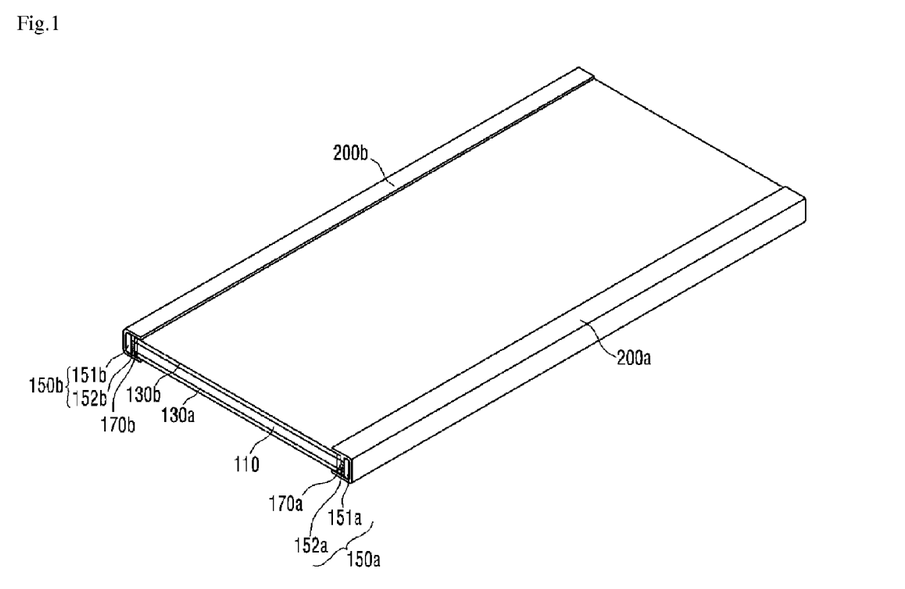
FIG. 1 is a perspective view of a lighting module according to an embodiment.
Figure 2:
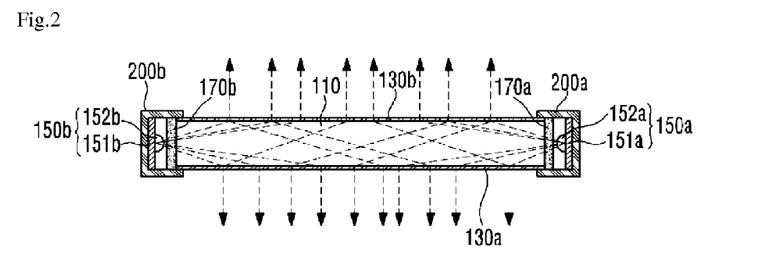
FIG. 2 is a cross sectional view of the lighting module according to the embodiment.

FIG. 1 is a perspective view of a lighting module according to an embodiment. FIG. 2 is a cross sectional view of the lighting module according to the embodiment.

Referring to FIGS. 1 and 2, a lighting module 100 according to an embodiment may include a first case 200a, a second case 200b, a first light source 150a, a second light source 150b, a first phosphor luminescent film 170a (hereafter, referred to as PLF), a second phosphor luminescent film 170b, a light guide plate 110 and diffuser plates 130a and 130b.

The first case 200a and the second case 200b may be manufactured by extrusion molding one plate. The first case 200a and the second case 200b may be formed by bending twice one plate. Also, the first case 200a and the second case 200b may include a seating portion by bending twice one plate. Specifically, this will be described with reference to FIG. 3.

Figure 3:
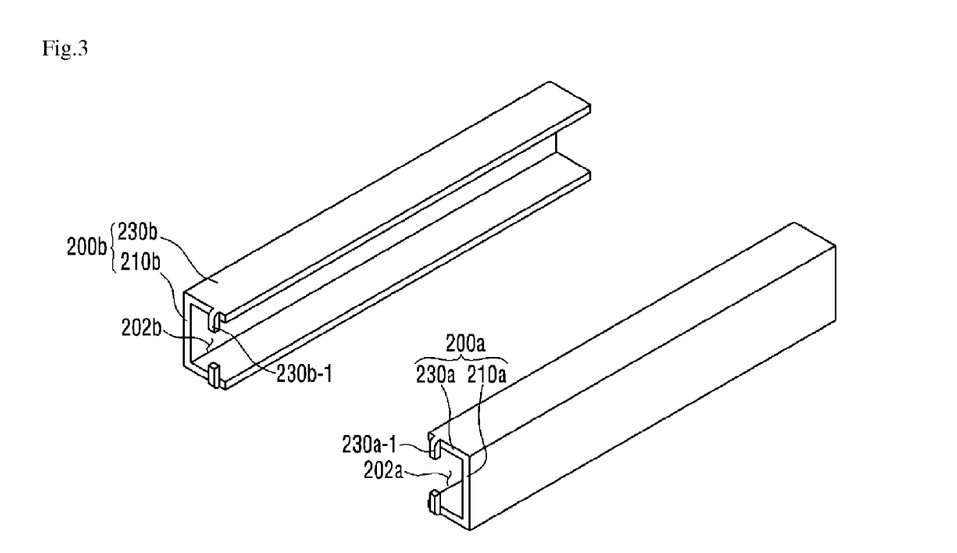
FIG. 3 is a perspective view of a first case and a second case shown in FIG. 1.

FIG. 3 is a perspective view of the first and the second cases shown in FIG. 1.

Referring to FIGS. 1 to 3, the first case 200a may include a first seating portion 202a in which the first light source 150a may be disposed. The second case 200b may include a second seating portion 202b in which the second light source 150b may be disposed.

The first case 200a includes a base 210a and a flange 230a. The first light source 150a is disposed in the base 210a. The flange 230a extends in a perpendicular direction from both side ends of the base 210a. The second case 200b includes a base 210b and a flange 230b. The second light source 150b is disposed in the base 210b. The flange 230b extends in a perpendicular direction from both side ends of the base 210b. The first and the second seating portions 202a and 202b may be formed by the bases 210a and 210b and the flanges 230a and 230b of the first and the second cases 200a and 200b.

The first and the second seating portions 202a and 202b may receive not only the first and the second light sources 150a and 150b but also a portion of the light guide plate 110. Specifically, one side of the light guide plate 110 is inserted into the first seating portion 202a. The other side of the light guide plate 110 is inserted into the second seating portion 202b.

The flanges 230a and 230b of the first and the second cases 200a and 200b may include projections 230a-1 and 230b-1. The projections 230a-1 and 230b-1 may extend outward from the flanges 230a and 230b. The projections 230a-1 and 230b-1 are able to limit the movement of the light guide plate 110 which is received in the first and the second seating portions 202a and 202b. Also, the projections 230a-1 and 230b-1 are able to prevent the light guide plate 110 from separating from the first and the second cases 200a and 200b.

It is recommended that the first and the second cases 200a and 200b should be made of a metallic material such as aluminum, an alloy including aluminum and iron and the like. Also, the first and the second cases 200a and 200b may have a predetermined elastic force.

The first case 200a has a consistent cross section in a longitudinal direction thereof. The second case 200b has a consistent cross section in a longitudinal direction thereof.

Referring back to FIGS. 1 to 2, the first and the second light sources 150a and 150b respectively include substrates 151a and 151b and light emitting devices 152a and 152b disposed on the substrates.

The substrate 151a of the first light source 150a and the substrate 151b of the second light source 150b are arranged to face each other. The light emitting device 152a of the first light source 150a and the light emitting device 152b of the second light source 150b are arranged to face each other. The substrate 151a and the light emitting device 152a of the first light source 150a are disposed in the first seating portion 202a of the first case 200a. The substrate 151b and the light emitting device 152b of the second light source 150b are disposed in the second seating portion 202b of the second case 200b.

The substrates 151a and 151b may be a printed circuit board (PCB), a metal core PCB (MCPCB), a flexible PCB (FPCB) or a ceramic substrate or the like.

The light emitting device 152a of the first light source 150a and the light emitting device 152b of the second light source 150b may emit white light having the same color temperature or may emit white lights having mutually different color temperatures. Here, when the light emitting device 152a of the first light source 150a and the light emitting device 152b of the second light source 150b emit lights having mutually different color temperatures, various color senses can be expressed through a combination of the two different color temperatures. Accordingly, emotional lighting can be created and a color rendering index (CRI) can be improved. As a result, it is possible to prevent an actual color of an object from being distorted and to reduce the fatigue of the eyes of users. For example, the light emitting device 152a of the first light source 150a may be a warm white light emitting device and the light emitting device 152b of the second light source 150b may be a cool white light emitting device.

The light emitting devices 152a and 152b may be a light emitting diode (hereinafter, referred to as LED). Here, the LED may emit one of blue light, red light and green light. The light emitting devices 152a and 152b may be a lateral type LED or a vertical type LED.

The light emitting devices 152a and 152b may include a fluorescent material. For example, when the light emitting devices 152a and 152b are a LED chip emitting blue light, the light emitting devices 152a and 152b may include a resin which covers the LED chip and includes the fluorescent material. The fluorescent material may be at least one of a garnet based fluorescent material (YAG, TAG), a silicate based fluorescent material, a nitride based fluorescent material and an oxynitride based fluorescent material.

While the light emitting devices 152a and 152b may be formed to emit natural light (white light) by using a yellow fluorescent material, the light emitting devices 152a and 152b may further include a green fluorescent material or a red fluorescent material in order to improve the color rendering index and to reduce the color temperature. Here, when various kinds of the fluorescent materials are mixed in the resin, the green fluorescent material may be more used than the red fluorescent material, and the yellow fluorescent material may be more used than the green fluorescent material.

The yellow fluorescent material may be YAG of the garnet based fluorescent material, a silicate based fluorescent material and an oxynitride based fluorescent material. The red fluorescent material may be a silicate based fluorescent material and an oxynitride based fluorescent material. The red fluorescent material may be a nitride based fluorescent material.

The resin may be composed of a first resin including the red fluorescent material, a second resin including the green fluorescent material and a third resin including the yellow fluorescent material as well as may be composed of various kinds of the fluorescent materials mixed therein. The light guide plate 110 is disposed between the first light source 150*a* and the second light source 150*b*.

The light guide plate 110 may have a plate shape having four sides, a top surface and a bottom surface.

The first light source 150*a* is disposed on one side of the light guide plate 110. The second light source 150*b* is disposed on the other side opposite to the one side of the light guide plate 110.

The light guide plate 110 is coupled to the first and the second cases 200*a* and 200*b*. Specifically, one side of the light guide plate 110 is inserted into the first seating portion 202*a* of the first case 200*a*. The other side of the light guide plate 110 is inserted into the second seating portion 202*b* of the second case 200*b*.

Light is incident on two sides of the light guide plate 110 and is emitted through the top and the bottom surfaces of the light guide plate 110. Specifically, the light guide plate 110 receives the light through the two sides thereof from the first and the second light sources 150*a* and 150*b*, and emits the received light outward through the top and the bottom surfaces.

The material of the of the light guide plate 110 may be any one of polyethylene terephthlate (PET), poly carbonate (PC), cycloolefin copolymer (COC) and polyethylene naphthalate (PEN) and an acrylic resin like polymethylmetaacrylate (PMMA) in consideration of thermal expansion depending on a temperature in use of the material.

The first phosphor luminescent film 170*a* may be disposed between the light guide plate 110 and the first light source 150*a*. The second phosphor luminescent film 170*b* may be disposed between the light guide plate 110 and the second light source 150*b*.

The first and the second phosphor luminescent films 170*a* and 170*b* may include a fluorescent material. The first and the second phosphor luminescent films 170*a* and 170*b* are excited by the light emitted from the first and the second light sources 150*a* and 150*b* and are able to emit light with a wavelength different from that of the light emitted from the first and the second light sources 150*a* and 150*b*. The light emitted from the first and the second light sources 150*a* and 150*b* is mixed with the light emitted from the first and the second phosphor luminescent films 170*a* and 170*b*, so that white light can be created.

The first and the second phosphor luminescent films 170*a* and 170*b* may include a transparent resin and a fluorescent material contained within the transparent resin. The transparent resin may include a curing agent or an additive. The curing agent cures the transparent resin. The additive uniformly disperses the fluorescent material within the transparent resin. The transparent resin may include a diffusion material. The diffusion material is able to improve an excitation ratio of the fluorescent material by improving the refraction of light.

A first diffuser plate 130*a* and a second diffuser plate 130*b* diffuse light which is emitted from the light guide plate 110. The first and the second diffuser plates 130*a* and 130*b* can remove a hot spot which may be generated in the light guide plate 110.

The first diffuser plate 130*a* may be disposed on the top surface of the light guide plate 110. The second diffuser plate 130*b* may be disposed on the bottom surface of the light guide plate 110.

Both sides of the first diffuser plate 130*a* and both sides of the second diffuser plate 130*b* may be disposed within the first and the second cases 200*a* and 200*b*. Specifically, both sides of the first diffuser plate 130*a* and both sides of the second diffuser plate 130*b* may be inserted into the first seating portion 202*a* of the first case 200*a* and the second seating portion 202*b* of the second case 200*b*.

Meanwhile, the first and the second diffuser plates 130*a* and 130*b* may be disposed on any one surface of the top and the bottom surfaces of the light guide plate 110. A reflective plate (not shown) may be disposed on the other surface. That is, the first diffuser plate 130*a* may be replaced by the reflective plate. In this case, since the first diffuser plate 130*a* reflects all of the light which is emitted from the bottom surface of the light guide plate 110, the light is emitted through the top surface of the light guide plate 110 and the second diffuser plate 130*b*.

The lighting module shown in FIGS. 1 to 2 is able to irradiate light in one direction and is also able to irradiate light not only in one direction but also in a direction symmetrical to the one direction at the same time.

Figure 4:
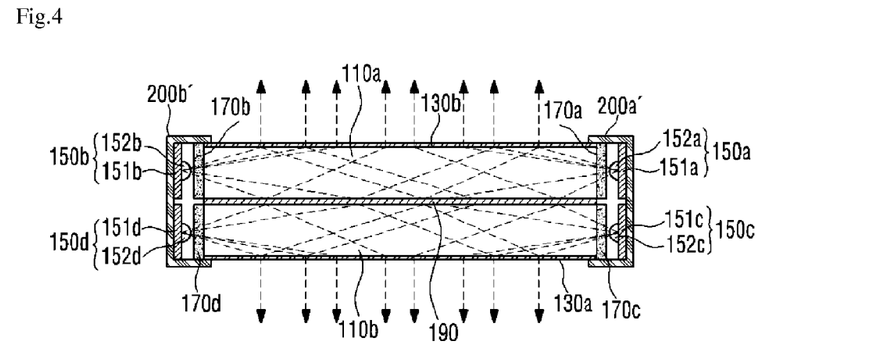
FIG. 4 is a cross sectional view of a lighting module according to another embodiment.

FIG. 4 is a cross sectional view of a lighting module according to another embodiment.

The lighting module shown in FIG. 4 includes the lighting module shown in FIGS. 1 to 3. Therefore, in description of the lighting module shown in FIG. 4, the same reference numerals are assigned to the same elements as those of the lighting module shown in FIGS. 1 to 3. Detailed descriptions of the same elements will be omitted.

The lighting module shown in FIG. 4 may include a first and a second cases 200*a*' and 200*b*', a first to a fourth light sources 150*a*, 150*b*, 150*c* and 150*d*, a first and a second light guide plates 110*a* and 110*b*, a first and a second diffuser plates 130*a* and 130*b*, a first to a fourth phosphor luminescent films 170*a*, 170*b*, 170*c* and 170*d* and a reflective plate 190.

The first case 200*a*' receives the first and the third light sources 150*a* and 150*c* and receives one sides of the first and the second light guide plates 110*a* and 110*b*. The second case 200*b*' receives the second and the fourth light sources 150*b* and 150*d* and receives the other sides of the first and the second light guide plates 110*a* and 110*b*.

The first and the third light sources 150*a* and 150*c* are received in the first case 200*a*' and disposed separately from each other in the first case 200*a*'. The first light source 150*a* emits light to one side of the first light guide plate 110*a*. The third light source 150*c* emits light to one side of the second light guide plate 110*b*. The first phosphor luminescent film 170*a* may be disposed between the first light source 150*a* and the first light guide plate 110*a*, that is, on the one side of the first light guide plate 110*a*. The third phosphor luminescent film 170*c* may be disposed between the third light source 150*c* and the second light guide plate 110*b*, that is, on the one side of the second light guide plate 110*b*.

The second and the fourth light sources 150*b* and 150*d* are received in the second case 200*b*' and disposed separately from each other in the second case 200*b*'. The second light source 150*b* emits light to the other side of the first light guide plate 110*a*. The fourth light source 150*d* emits light to the other side of the second light guide plate 110*b*. The second phosphor luminescent film 170*b* may be disposed between the second light source 150*b* and the first light guide plate 110*a*, that is, on the other side of the first light guide plate 110*a*. The fourth phosphor luminescent film 170*d* may be disposed between the fourth light source 150*d* and the second light guide plate 110*b*, that is, on the other side of the second light guide plate 110*b*.

The first light guide plate 110*a* is disposed between the first light source 150*a* and the second light source 150*b*. The second light guide plate 110*b* is disposed between the third light source 150*c* and the fourth light source 150*d*.

The second light guide plate 110b is disposed below the first light guide plate 110a. Specifically, the bottom surface of the first light guide plate 110a is disposed above the top surface of the second light guide plate 110b.

The reflective plate 190 may be disposed between the first light guide plate 110a and the second light guide plate 110b. One side of the reflective plate 190 may be disposed contacting with the bottom surface of the first light guide plate 110a. The other side the reflective plate 190 may be disposed contacting with the top surface of the second light guide plate 110b. Micro lenses may be arranged on both sides of the reflective plate 190 in the form of an array.

Light emitted from the first light source 150a and the second light source 150b is incident on both sides of the first light guide plate 110a and travels along an optical path within the first light guide plate 110a. A part of the light traveling within the first light guide plate 110a is directly emitted through the top surface of the first light guide plate 110a. The rest of the light is reflected by the reflective plate 190 and is emitted through the top surface of the first light guide plate 110a.

Light emitted from the third light source 150c and the fourth light source 150d is incident on both sides of the second light guide plate 110b and travels along an optical path within the second light guide plate 110b. A part of the light traveling within the second light guide plate 110b is directly emitted through the bottom surface of the second light guide plate 110b. The rest of the light is reflected by the reflective plate 190 and is emitted through the bottom surface of the second light guide plate 110b.

The first diffuser plate 130a may be disposed on the bottom surface of the second light guide plate 110b. The second diffuser plate 130b may be disposed on the top surface of the first light guide plate 110a.

Meanwhile, positions of the first diffuser plate 130a and the reflective plate 190 may be changed. In other words, the first diffuser plate 130a may be disposed between the first light guide plate 110a and the second light guide plate 110b, and the reflective plate 190 may be disposed on the bottom surface of the second light guide plate 110b. In this case, the lighting module according to the embodiment is able to emit light only through the top surface of the first light guide plate 110a.

An amount of the light which is emitted from the top surface of the first light guide plate 110a may be equal to or not equal to an amount of the light which is emitted from the bottom surface of the second light guide plate 110b. Here, when the material of the first light guide plate 110a is different from the material of the second light guide plate 110b, the amount of the light which is emitted from the first light guide plate 110a may be different from the amount of the light which is emitted from the second light guide plate 110b.

Color temperatures of the light emitting device 152a of the first light source 150a, the light emitting device 152b of the second light source 150b, the light emitting device 152c of the third light source 150c and the light emitting device 152d of the fourth light source 150d may be different from one another. For example, the light emitting device 152a of the first light source 150a and the light emitting device 152b of the second light source 150b may be warm white LEDs. The light emitting device 152c of the third light source 150c and the light emitting device 152d of the fourth light source 150d may be cool white LEDs.

The reflective plate 190 has a rectangular plate shape corresponding to the shapes of the first light guide plate 110a and the second light guide plate 110b. The reflective plate 190 may be formed of a flexible plastic material.

Both entire surfaces of the reflective plate 190 may be coated with a reflective material. Additionally, the reflective material may be coated only on surfaces of portions which correspond to actual light emitting areas of the first and the second diffuser plates 130a and 130b.

Reflectances of the reflective materials coated on the both surfaces of the reflective plate 190 may not be equal to each other. Accordingly, it is possible to cause the amounts of the lights emitted from the first and the second light guide plates 110a and 110b to be different from each other.

A lens array is disposed on both sides of the reflective plate 190. The amounts of the lights emitted from the first and the second light guide plates 110a and 110b can be different from each other by causing an interval between adjacent lenses in the lens array disposed on one side to be different from an interval between adjacent lenses in the lens array disposed on the other side.

The reflective plate 190 is disposed between the first and the second light guide plates 110a and 110b. The reflective plate 190 prevents the light emitted from the first and the second light sources 150a and 150b from being incident on the second light guide plate 110b, and prevents the light emitted from the third and the fourth light sources 150c and 150d from being incident on the first light guide plate 110a.

Figure 5:
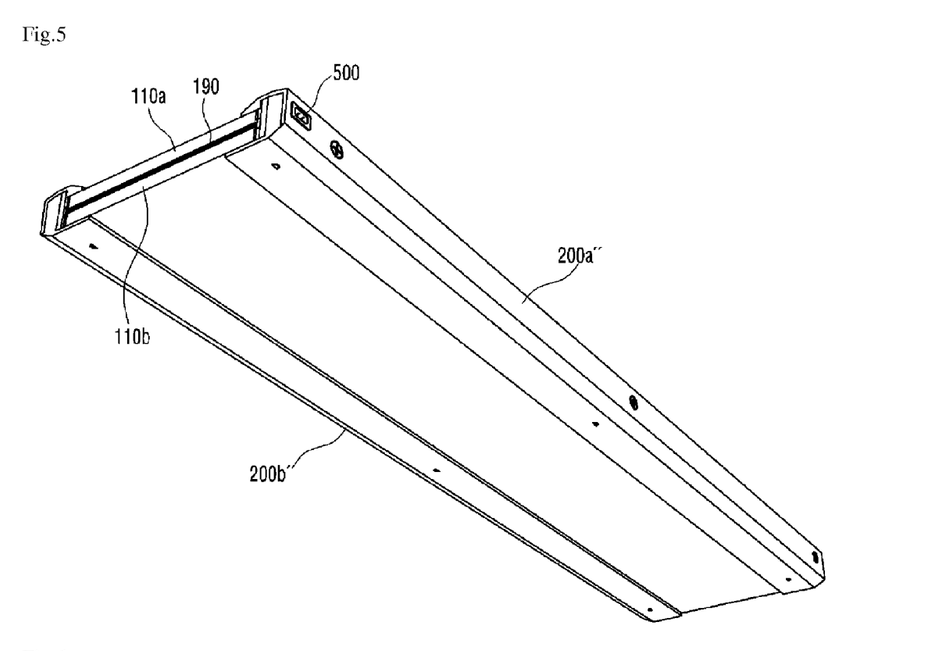
FIG. 5 is a perspective view of a lighting module according to further another embodiment.
Figure 6:
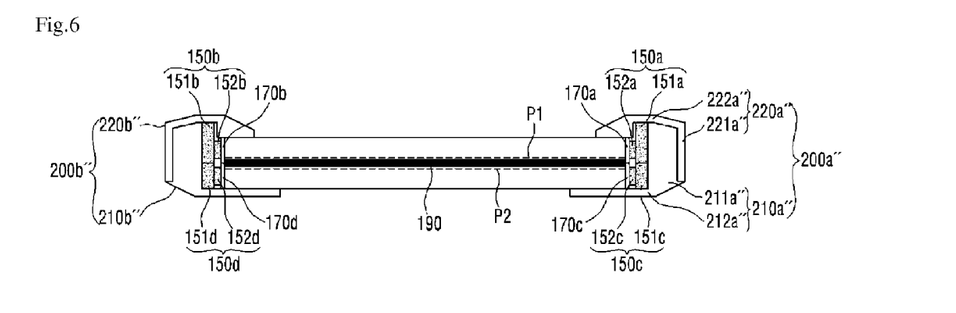
FIG. 6 is a cross sectional view of the lighting module shown in FIG. 5.
Figure 7:
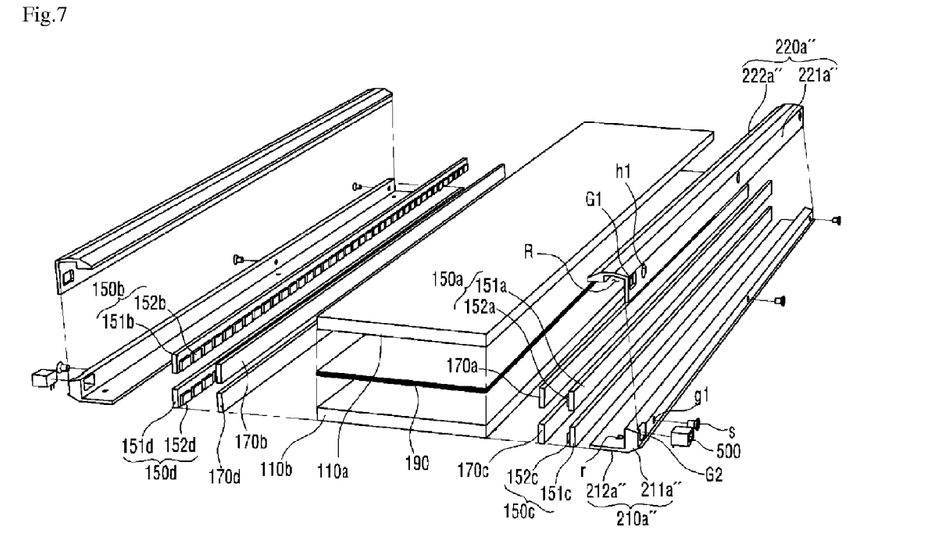
FIG. 7 is an exploded perspective view of the lighting module shown in FIG. 5.

FIG. 5 is a perspective view of a lighting module according to further another embodiment. FIG. 6 is a cross sectional view of the lighting module shown in FIG. 5. FIG. 7 is an exploded perspective view of the lighting module shown in FIG. 5.

Referring to FIGS. 5 to 7, the lighting module according to the embodiment is similar to the lighting module shown in FIG. 4. Therefore, in description of the lighting module shown in FIGS. 5 to 7, the same reference numerals are assigned to the same elements as those of the lighting module shown in FIG. 4. Detailed descriptions of the same elements will be omitted.

The lighting module shown in FIGS. 5 to 7 includes a first case 200a", a second case 200b", a first to a fourth light sources 150a, 150b, 150c and 150d, a first to a fourth phosphor luminescent films 170a, 170b, 170c and 170d, a first and a second light guide plates 110a and 110b and a reflective plate 190.

The first case 200a" receives the first and the third light sources 150a and 150c and covers one sides of the first and the second light guide plates 110a and 110b. The second case 200b" receives the second and the fourth light sources 150b and 150d and covers the other sides of the first and the second light guide plates 110a and 110b. Since the second case 200b" is the same as the first case 200a", a description of the second case 200b" is replaced by a description of the first case 200a".

The first case 200a" includes a lower case 210a" and an upper case 220a". The lower case 210a" and the upper case 220a" may be coupled to each other by a plurality of screws "S".

The lower case 210a" includes a base 211a" and an extension part 212a". The first and the third light sources 150a and 150c are disposed on the inner surface of the base 211a". The extension part 212a" extends from one side edge of the inner surface of the base 211a" in a direction perpendicular to the inner surface. The extension part 212a" contacts with the bottom surface of the second light guide plate 110b and supports the second light guide plate 110b.

The upper case 220a" includes a base 221a" and an extension part 222a". The base 211a" of the lower case 210a" is disposed on the inner surface of the base 221a". The extension part 222a" extends from one side edge of the inner surface of the base 221a" in a direction perpendicular to the inner surface. The extension part 222a" contacts with the top surface of the first light guide plate 110a and supports the first light guide plate 110a.

Here, a length of the extension part 222a" of the upper case 220a" may be different from that of the extension part 212a" of the lower case 210a". For example, the length of the extension part 222a" of the upper case 220a" may be less than that of the extension part 212a" of the lower case 210a".

The base 211a" of the lower case 210a" may include a recess "g1". The base 221a" of the upper case 220a" may include a hole "h1". The hole "h1" corresponds to the recess "g1". Therefore, when the lower case 210a" is coupled to the upper case 220a", the screw "S" passes through the hole "h1" and is inserted into the recess "g1". As a result, the base 211a" of the lower case 210a" is fixed close to the base 221a" of the upper case 220a". Here, the base 211a" of the lower case 210a" includes the recess "g1" instead of the hole in order that the first and the third light sources 150a and 150c are prevented from being damaged or broken by the screw "S" and from being electrically contacted with the screw "S".

The base 211a" of the lower case 210a" includes an opening G2. The base 221a" of the upper case 220a" includes an opening G1. The opening G2 of the lower case 210a" is disposed at a position corresponding to the opening G1 of the upper case 220a". Specifically, the opening G2 and the opening G1 may be disposed on one side of the first and the third light sources 150a and 150c, respectively. A driving driver 500 is disposed in the opening G2 of the lower case 210a" and the opening G1 of the upper case 220a". The driving driver 500 is electrically connected with the first and the third light sources 150a and 150c and supplies the first and the third light sources 150a and 150c with electric power from the outside. The driving driver 500 is also able to control the on/off of the first and the third light sources 150a and 150c.

Though not shown in the drawings, the extension part 212a" of the lower case 210a" may include a recess into which one side of a substrate 151c of the third light source 150c is inserted. The extension part 222a" of the upper case 220a" may include a recess into which one side of a substrate 151a of the first light source 150a is inserted.

The inner surface of the extension part 212a" of the lower case 210a" may include a receiving recess "r". This will be described in detail with reference to FIG. 8.

Figure 8:
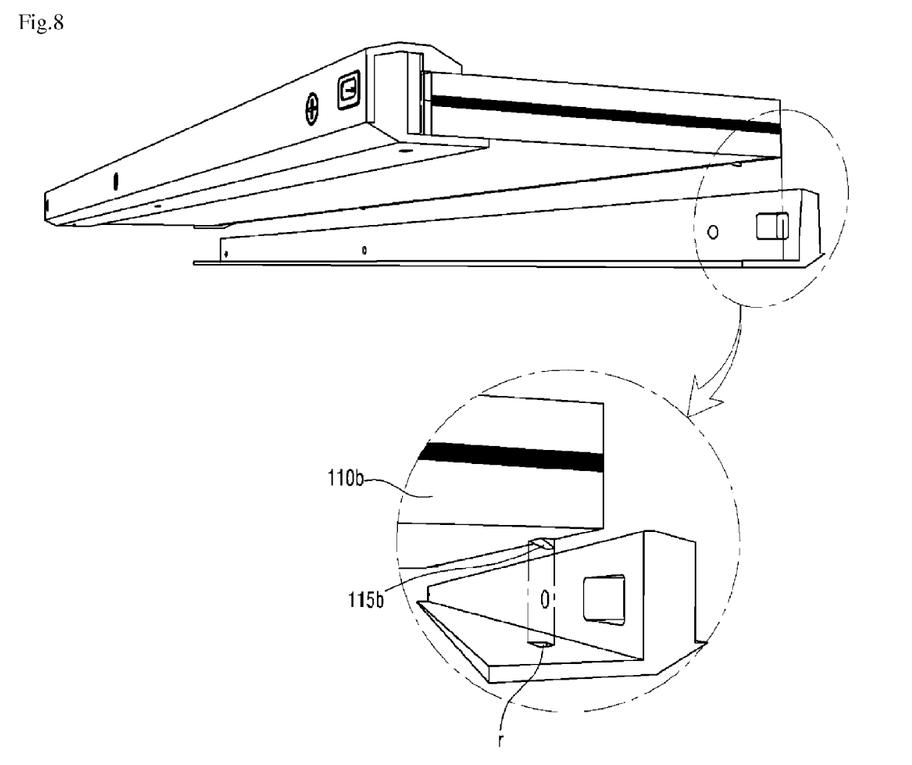

FIG. 8 is a view for describing how the first case 200a" of the lighting module shown in FIG. 5 is coupled to the first and the second light guide plates 110a and 110b of the lighting module shown in FIG. 5.

Referring to FIG. 8, a protrusion 115b formed on the bottom surface of the second light guide plate 110b is inserted into the receiving recess "r" of the extension part 212a" of the lower case 210a". Therefore, a coupling force between the extension part 212a" of the lower case 210a" and the second light guide plate 110b can be strengthened and the second light guide plate 110b can be prevented from moving or separating. Here, the receiving recess "r" may be formed in the inner surface of the extension part 222a" of the upper case 220a". The protrusion 115b may be formed on the top surface of the first light guide plate 110a.

The base 211a" of the lower case 210a" and the extension part 212a" of the lower case 210a" may be independently formed. The lower case 210a" may be configured by coupling the base 211a" and the extension part 212a". The base 221a" of the upper case 220a" and the extension part 222a" of the upper case 220a" may be also independently formed. The upper case 220a" may be configured by coupling the base 221a" and the extension part 222a".

The upper case 220a" may include a receiving portion "R". The receiving portion "R" receives one side of the first light source 150a and one side of the base 211a" of the lower case 210a".

The first to the fourth light sources 150a, 150b, 150c, and 150d respectively include the substrates 151a 151b, 151c, and 151d and the light emitting devices 152a, 152b, 152c and 152d disposed on the substrates.

The first light source 150a and the second light source 150b are arranged to face each other. The first light guide plate 110a is disposed between the first and the second light sources 150a and 150b. The third light source 150c and the fourth light source 150d are arranged to face each other. The second light guide plate 110b is disposed between the third and the fourth light sources 150c and 150d.

The first light source 150a and the third light source 150c are disposed in the first case 200a". The second light source 150b and the fourth light source 150d are disposed in the second case 200b". The first light source 150a and the third light source 150c are disposed adjacent to or separately from each other in the first case 200a". The second light source 150b and the fourth light source 150d are disposed adjacent to or separately from each other in the second case 200b".

Here, in the drawings, the substrate 151a of the first light source 150a is physically and electrically separated from the substrate 151c of the third light source 150c. However, the substrate 151a of the first light source 150a and the substrate 151c of the third light source 150c may be one substrate, and the light emitting device 152a included in the first light source 150a may be electrically separated from the light emitting device 152c included in the third light source 150c.

The light emitting devices included in the first and the second light sources 150a and 150b may emit light having the same color as that of light which is emitted from the light emitting devices included in the third and fourth light sources 150c and 150d or may emit light having a color different from that of light which is emitted from the light emitting devices included in the third and fourth light sources 150c and 150d. Therefore, light having various colors can be created through a combination of the two different colors and emotional lighting can be created.

The light emitting devices included in the first and the second light sources 150a and 150b may have different color temperature from that of the light emitting devices included in the third and fourth light sources 150c and 150d.

The light emitting devices 152a, 152b, 152c and 152d of the first to the fourth light sources 150a, 150b, 150c and 150d may be a blue light emitting device. However, the light emitting devices 152a, 152b, 152c and 152d may be a white light emitting device having a high color rendering index (CRI) if possible.

The light emitting device 152a of the first light source 150a and the light emitting device 152b of the second light source 150b may be warm white LEDs. The light emitting device 152c of the third light source 150c and the light emitting device 152d of the fourth light source 150d may be cool white LEDs.

The number of the light emitting devices 152a and 152b of the first and the second light sources 150a and 150b may be the same as or not the same as that of the light emitting devices 152c and 152d of the third and the fourth light sources 150c and 150d. When the number of the light emitting devices 152a and 152b of the first and the second light sources 150a and 150b is not the same as that of the light emitting devices 152c and 152d of the third and the fourth light sources 150c and 150d, an amount of the light which is emitted through the top surface of the first light guide plate 110a may be different from an amount of the light which is emitted through the bottom surface of the second light guide plate 110b. When the lighting module according to the embodiment is controlled such that the amount of the light which is emitted through the top surface of the lighting module is smaller than that of the light which is emitted through the bottom surface of the lighting module, the number of the light emitting devices 152c and 152d of the third and the fourth light sources 150c and 150d should be greater than that of the light emitting devices 152a and 152b of the first and the second light sources 150a and 150b.

The amounts of the lights which is emitted upward and downward from the lighting module according to the embodiment can be adjusted by varying values of currents applied to the first and the second light sources 150a and 150b and the third and the fourth light sources 150c and 150d. For example, in order that the amount of any one of the lights which is emitted upward and downward from the lighting module according to the embodiment is greater than that of the other, a value of a current applied to a light source emitting the light having the greater amount should be relatively increased.

The first light guide plate 110a is optically coupled to the first and the second light sources 150a and 150b. The second light guide plate 110b is optically coupled to the third and the fourth light sources 150c and 150d.

The second light guide plate 110b is disposed below the first light guide plate 110a.

One sides of the first and the second light guide plates 110a and 110b are received in the first case 200a". The other sides of the first and the second light guide plates 110a and 110b are received in the second case 200b".

One sides of the first and the second light guide plates 110a and 110b may include a coating film having a particular pattern or a roughness in order to allow the light incident into the inside of the first and the second light guide plates 110a and 110b to be emitted outward. The coating film having the particular pattern or the roughness diffuses or scatters the light, and then is able to control alight distribution characteristic of the light which is outwardly emitted.

Specifically, the first light guide plate 110a has a first pattern "P1". The second light guide plate 110b has a second pattern "P2". The first pattern "P1" may be disposed adjacent to the bottom surface of the first light guide plate 110a. The second pattern "P2" may be disposed adjacent to the top surface of the second light guide plate 110b. The first pattern "P1" and the second pattern "P2" may have the same shape or mutually different shapes. Here, though the first pattern "P1" and the second pattern "P2" have the same shape, the sizes of the patterns, intervals between the respective patterns or densities formed by the patterns may be different from each other.

The first pattern "P1" and the second pattern "P2" may include a plurality of dot patterns which are easy to form. The first pattern "P1" and the second pattern "P2" may include not only the dot pattern but also a pattern having a shape different from the dot pattern.

The first pattern "P1" and the second pattern "P2" may be formed by using an inkjet printing method or other various methods or may be formed when a plurality of lenses are formed on one sides of the first and the second light guide plates 110a and 110b or when the one sides themselves have a shape of a plurality of lenses. The lens has a size of a micro unit. The lens may be formed on entire one side surfaces of the first and the second light guide plates 110a and 110b or may be formed only on surfaces which correspond to actual light emitting areas of the first and the second light guide plates 110a and 110b.

The light distribution characteristic of the light which is emitted upward and downward from the lighting module can be controlled by differentiating the patterns formed on the one sides of the first and the second light guide plates 110a and 110b.

The reflective plate 190 is disposed between the first and the second light guide plates 110a and 110b. The reflective plate 190 prevents the light emitted from the first and the second light sources 150a and 150b from being incident on the second light guide plate 110b, and prevents the light emitted from the third and the fourth light sources 150c and 150d from being incident on the first light guide plate 110a.

The first phosphor luminescent film 170a is disposed between the first light guide plate 110a and the first light source 150a. The second phosphor luminescent film 170b is formed between the first light guide plate 110a and the second light source 150b. The third phosphor luminescent film 170c is formed between the second light guide plate 110b and the third light source 150c. The fourth phosphor luminescent film 170d is formed between the second light guide plate 110b and the fourth light source 150d.

The first to the fourth phosphor luminescent films 170a to 170d may include a fluorescent material. The first to the fourth phosphor luminescent films 170a to 170d change a portion of the wavelength of the light emitted from the first to the fourth light sources 150a to 150d and change the color of the light.

Figure 9:
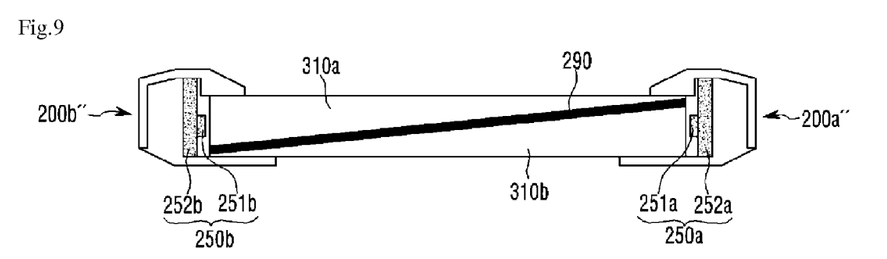
FIG. 9 is a cross sectional view of a lighting module according to still another embodiment.

FIG. 9 is a cross sectional view of a lighting module according to still another embodiment.

Referring to FIG. 9, since a first and a second cases 200a" and 200b" are the same as the first and the second cases 200a" and 200b" of the lighting module shown in FIG. 5 and other portions not mentioned are the same as those of the lighting module shown in FIG. 5, descriptions thereabout will be omitted.

The first case 200a" receives one first light source 250a. The second case 200b" receives one second light source 250b.

A first light guide plate 310a becomes thinner the closer it is to one side from the other side of the first light guide plate 310a. The first light guide plate 310a becomes thinner the closer it is to the first light source 250a from the second light source 250b. A second light guide plate 310b becomes thinner the closer it is to one side from the other side of the second light guide plate 310b. The second light guide plate 210a becomes thinner the closer it is to the second light source 250b from the first light source 250a.

The first light guide plate 310a includes a first inclined surface. The second light guide plate 310b includes a second inclined surface. The first inclined surface of the first light guide plate 310a and the second inclined surface of the second light guide plate 310b are disposed to face each other. A reflective plate 290 is disposed between the first inclined surface of the first light guide plate 310a and the second inclined surface of the second light guide plate 310b.

Figure 10:
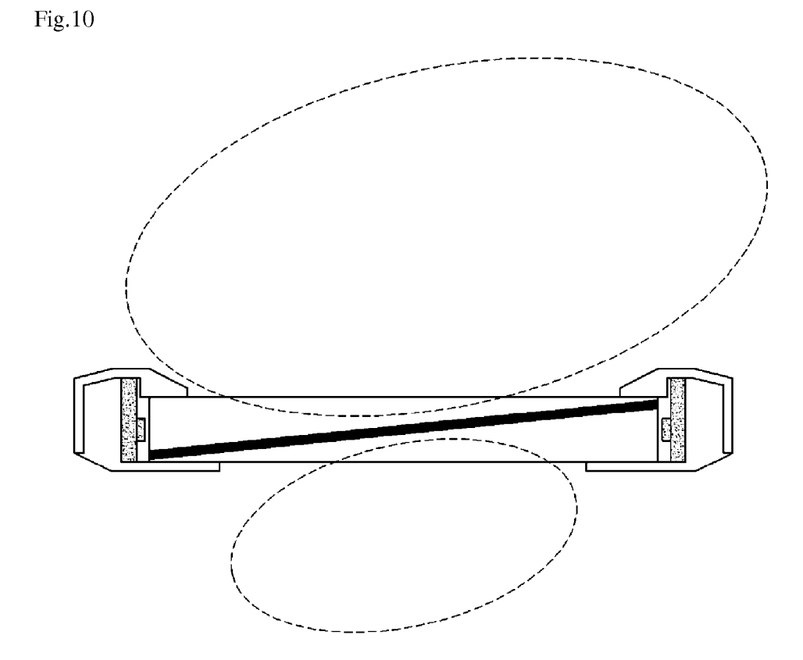
FIG. 10 is a view showing the light distribution characteristic of the lighting module shown in FIG. 9.

FIG. 10 is a view showing the light distribution characteristic of the lighting module shown in FIG. 9.

Referring to FIG. 10, the light distribution characteristic of the lighting module shown in FIG. 9 leans in one direction. This can occur when the first and the second light guide plates 210a and 210b have no predetermined pattern. The lighting module can be used in a spatial structure suitable for the light distribution characteristic. However, in general, the lighting module is necessary to have a Lambertian light distribution characteristic.

Figure 11:
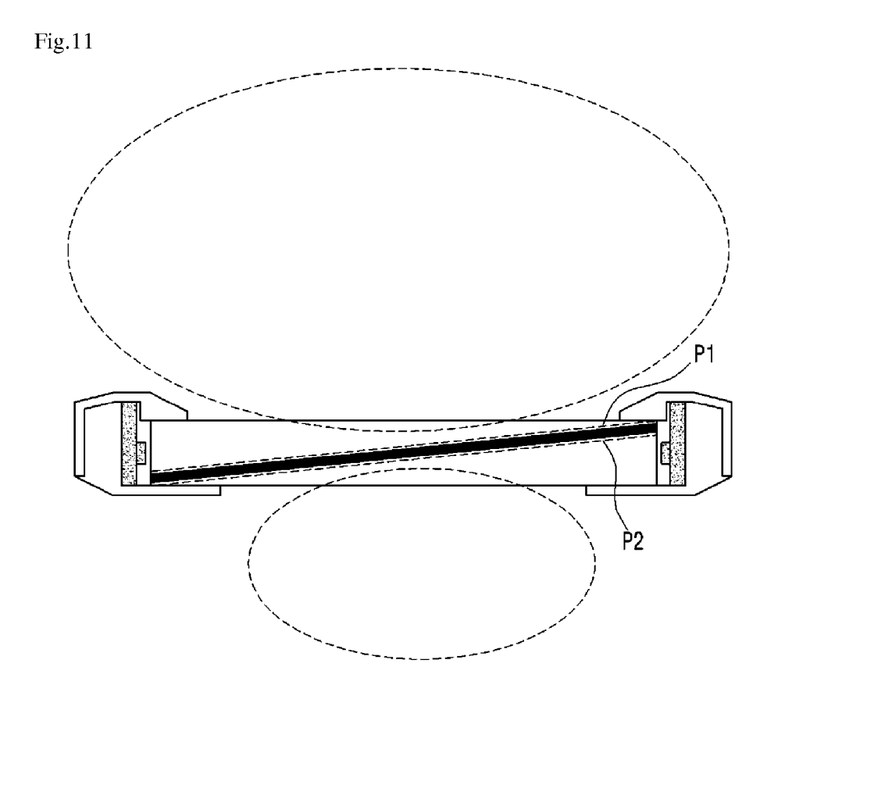
FIG. 11 is a view showing a lighting module according to still another embodiment and a light distribution characteristic of the lighting module.

FIG. 11 is a view showing a lighting module according to still another embodiment and a light distribution characteristic of the lighting module.

The lighting module shown in FIG. 11 is formed by adding a first pattern "P1" to the first light guide plate of the lighting module of FIG. 10 and by adding a second pattern "P2" to the second light guide plate of the lighting module of FIG. 10. It can be seen that the light distribution characteristic of the lighting module shown in FIG. 11 does not lean in one direction due to the first pattern "P1" and the second pattern "P2".

Referring to FIG. 11, the sizes, densities and shapes and the like of the first pattern "P1" and the second pattern "P2" may be or not the same as each other. Accordingly, even though the structures of the light guide plates become different from each other, the light which is emitted upward and downward from the lighting module is able to have a Lambertian light distribution characteristic. As a result, the lighting module can be substantially used more widely as a lighting device.

Figure 12:
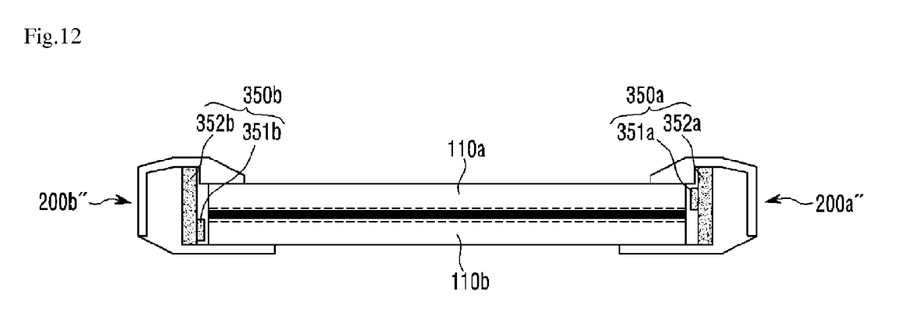
FIG. 12 is a cross sectional view of a lighting module according to still another embodiment.

FIG. 12 is a cross sectional view of a lighting module according to still another embodiment.

Referring to FIG. 12, the structure of the lighting module shown in FIG. 12 is almost the same as the structure of the lighting module shown in FIG. 6.

A first and a second light sources 350a and 350b include substrates 351a and 351b and light emitting devices 352a and 352b. The light emitting device 352a of the first light source 350a is disposed on one side of a first light guide plate 110a and emits light to the first light guide plate 110a. The light emitting device 352b of the second light source 350b is disposed on one side of a second light guide plate 110b and emits light to the second light guide plate 110b.

The following Table 1 shows the specifications of the lighting modules shown in FIGS. 1 to 12.

TABLE 1

| Product | Item | | Value | |
|---|---|---|---|---|
| Strip Spec. (13S * 5P) | Voltage (V) | | 39 | |
| | Current (mA) | | 350 | |
| | Power (W) | | 13.65 | |
| Module Spec. | Total Lumen output (lm) | Up Lumen Output | 2,500 | 2,000 |
| | | Down Lumen Output | | 500 |
| | Module Power (W) | | 27.3 | |
| | Efficacy (lm/W) | | 90 | |
| | CCT (K) | | 4,000 | |
| | CRI | | 80 | |
| Fixture Spec. | Lumen Output (lm) | | 10,000 (Up: 8,000, Down: 2,000) | |
| | DC Power Consumption (W) | | 110 | |

Referring to Table 1, in the lighting modules shown in FIGS. 1 to 12, an up lumen output is greater than a down lumen output or may be less than the down lumen output. For example, a ratio of the up lumen output to the down lumen output maybe from 6:4 to 8:2.

Meanwhile, a value of width W (mm)×height H (mm)× length L (mm) of the lighting modules shown in FIGS. 1 to 12 may be either 80×12×560 or 45×12×560.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting module comprising:
a first side light source;
a second side light source;
a first light guide plate disposed between the first side light source and the second side light source;
a second light guide plate disposed between the first side light source and the second side light source and disposed below the first light guide plate;
a reflective plate between the first light guide plate and the second light guide plate;
a first case coupled to one side of the first light guide plate, coupled to one side of the second light guide plate, and receiving the first side light source; and
a second case coupled to the other side of the first light guide plate, coupled to the other side of the second light guide plate, and receiving the second side light source,
wherein the reflective plate comprises a top surface and a bottom surface and wherein the top and the bottom surfaces of the reflective plate are coated with reflective materials having mutually different reflectances respectively, and
wherein an amount of light which is emitted through a top surface of the first light guide plate is not equal to an amount of light which is emitted through a bottom surface of the second light guide plate.

2. The lighting module of claim 1, wherein the first case comprises a base in which the first side light source is disposed, a first extension part extending from the base and a second extension part extending from the base, and wherein a length of the first extension part is less than a length of the second extension part.

3. The lighting module of claim 1, wherein the first side light source comprises a first light source and a third light source, wherein the second side light source comprises a second light source and a fourth light source, wherein the first and the second light sources are disposed on both sides of the first light guide plate respectively, and wherein the third and the fourth light sources are disposed on both sides of the second light guide plate respectively.

4. The lighting module of claim 1, further comprises:
a first diffuser plate disposed on a top surface of the first light guide plate;
a second diffuser plate disposed on a bottom surface of the second light guide plate;
a first phosphor luminescent film disposed on the a first side surface of the first and second light guide plate; and
a second phosphor luminescent film disposed on the a second side surface of the first and second light guide plate.

5. The lighting module of claim 1, wherein a ratio of an amount of light emitted through a top surface of the first light guide plate to an amount of light emitted through a bottom surface of the second light guide plate is from 6:4 to 8:2.

6. A lighting module comprising:
a first side light source;
a second side light source;
a first light guide plate disposed between the first side light source and the second side light source;
a second light guide plate disposed between the first side light source and the second side light source and disposed below the first light guide plate;
a reflective plate between the first light guide plate and the second light guide plate;
a first case coupled to one side of the first light guide plate, coupled to one side of the second light guide plate, and receiving the first side light source; and
a second case coupled to the other side of the first light guide plate, coupled to the other side of the second light guide plate, and receiving the second side light source,
wherein a material of the first light guide plate is different from a material of the second light guide plate, and
wherein an amount of light which is emitted through a top surface of the first light guide plate is not equal to an amount of light which is emitted through a bottom surface of the second light guide plate.

7. The lighting module of claim 6, wherein the first light guide plate comprises a first inclined surface, wherein the second light guide plate comprises a second inclined surface disposed to face the first inclined surface, and wherein the reflective plate is disposed between the first inclined surface and the second inclined surface.

8. The lighting module of claim 7, wherein the first inclined surface comprises a first pattern disposed adjacent to the reflective plate, wherein the second inclined surface comprises a second pattern disposed adjacent to the reflective plate, and wherein the first pattern and the second pattern have the same shape or mutually different shapes.

9. The lighting module of claim 8, wherein the first pattern and the second pattern comprise a plurality of dot patterns, and wherein sizes of the first and the second patterns are different from each other or densities of the first and the second patterns are different from each other.

10. The lighting module of claim 6, wherein the first case comprises a base in which the first side light source is disposed, a first extension part extending from the base and a second extension part extending from the base, and wherein a length of the first extension part is less than a length of the second extension part.

11. The lighting module of claim 6, wherein the first side light source comprises a first light source and a third light source, wherein the second side light source comprises a second light source and a fourth light source, wherein the first and the second light sources are disposed on both sides of the first light guide plate respectively, and wherein the third and the fourth light sources are disposed on both sides of the second light guide plate respectively.

12. The lighting module of claim 6, further comprises:
a first diffuser plate disposed on a top surface of the first light guide plate;
a second diffuser plate disposed on a bottom surface of the second light guide plate;
a first phosphor luminescent film disposed on the a first side surface of the first and second light guide plate; and
a second phosphor luminescent film disposed on the a second side surface of the first and second light guide plate.

13. The lighting module of claim 6, wherein a ratio of an amount of light emitted through a top surface of the first light guide plate to an amount of light emitted through a bottom surface of the second light guide plate is from 6:4 to 8:2.

14. A lighting module comprising:
a first light guide plate;
a second light guide plate disposed below the first light guide plate;
a reflective plate between the first light guide plate and the second light guide plate;
a first and a second light sources which are disposed on both sides of the first light guide plate respectively;
a third and a fourth light sources which are disposed on both sides of the second light guide plate respectively;
a first case coupled to one side of the first light guide plate and to one side of the second light guide plate; and
a second case coupled to the other side of the first light guide plate and to the other side of the second light guide plate,
wherein a value of current applied to the first and the second light sources is different from a value of current applied to the third and fourth light sources, and
wherein an amount of light which is emitted through a top surface of the first light guide plate is not equal to an amount of light which is emitted through a bottom surface of the second light guide plate.

15. The lighting module of claim 14, wherein the first light guide plate comprises a first inclined surface, wherein the second light guide plate comprises a second inclined surface disposed to face the first inclined surface, and wherein the reflective plate is disposed between the first inclined surface and the second inclined surface.

16. The lighting module of claim 15, wherein the first inclined surface comprises a first pattern disposed adjacent to the reflective plate, wherein the second inclined surface comprises a second pattern disposed adjacent to the reflective plate, and wherein the first pattern and the second pattern have the same shape or mutually different shapes.

17. The lighting module of claim 16, wherein the first pattern and the second pattern comprise a plurality of dot patterns, and wherein sizes of the first and the second patterns are different from each other or densities of the first and the second patterns are different from each other.

18. The lighting module of claim 14, wherein the first case comprises a base in which the first and the third light sources are disposed, a first extension part extending from the base and a second extension part extending from the base, and wherein a length of the first extension part is less than a length of the second extension part.

19. The lighting module of claim 14, further comprises:
a first diffuser plate disposed on a top surface of the first light guide plate;
a second diffuser plate disposed on a bottom surface of the second light guide plate;
a first phosphor luminescent film disposed between the first light source and the first light guide plate;
a second phosphor luminescent film disposed between the second light source and the first light guide plate;
a third phosphor luminescent film disposed between the third light source and the second light guide plate; and
a fourth phosphor luminescent film disposed between the fourth light source and the second light guide plate.

20. The lighting module of claim 14, wherein a ratio of an amount of light emitted through a top surface of the first light guide plate to an amount of light emitted through a bottom surface of the second light guide plate is from 6:4 to 8:2.

* * * * *